United States Patent
Kamiya et al.

[15] 3,650,005
[45] Mar. 21, 1972

[54] METHOD FOR PRODUCING TUBE IN SHEETS

[72] Inventors: Osamu Kamiya, Osaka; Yuichiro Asano; Tomiyoshi Kanai, both of Tochigi, all of Japan

[73] Assignee: Showa Aluminum Kabushiki Kaisha, Osaka, Japan

[22] Filed: Mar. 19, 1970

[21] Appl. No.: 20,972

[52] U.S. Cl. ...................29/157.3 V, 29/470.9, 29/527.2, 113/118 D
[51] Int. Cl. ...................B21d 53/02, B21k 29/00
[58] Field of Search ...................29/157.3 V, 470.9, DIG. 99, 29/DIG. 21, 527.2; 113/118 D

[56] References Cited

UNITED STATES PATENTS

| | | | |
|---|---|---|---|
| 3,167,405 | 1/1965 | Muije et al. | 29/157.3 V X |
| 2,690,002 | 9/1954 | Grenell | 29/157.3 V |
| 3,018,543 | 1/1962 | Beck | 29/157.3 V |
| 3,053,511 | 9/1962 | Godfrey | 29/157.3 V X |

Primary Examiner—John F. Campbell
Assistant Examiner—Donald C. Reiley, III
Attorney—Dawson, Tilton, Fallon & Lungmus

[57] ABSTRACT

A method for producing tube in sheet is applied a pasty stop weld prepared by adding a solvent to a zinc powder or powdered zinc alloy having a purity of at least about 90 percent and kneading the resultant mixture. This stop weld material is applied, in desired pattern, between at least two aluminum sheets, which are then roll-bonded with part left nonbonded where the stop weld is applied. The coalesced sheets are thereafter annealed, whereby the sheets are softened to the extent suitable for the subsequent treatment while the zinc or zinc alloy serving as the stop weld is diffused into the inner faces of the aluminum sheets to form aluminum zinc layers. In the last step, a highly pressurized fluid is forced into the nonbonded portion, which is therefore distended into a tubular form to provide a passage.

5 Claims, 5 Drawing Figures

PATENTED MAR 21 1972
3,650,005
FIG. 1
FIG. 5
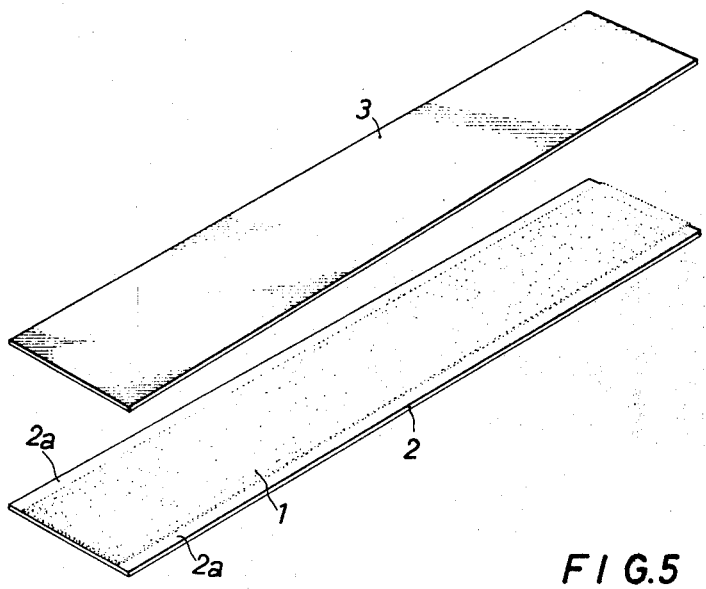
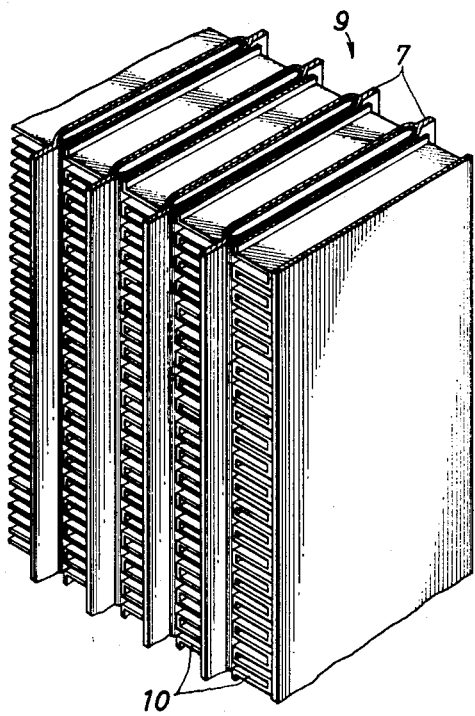
FIG. 2
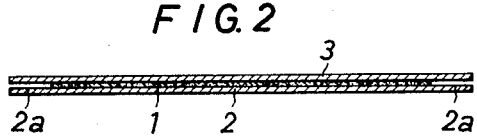
FIG. 3
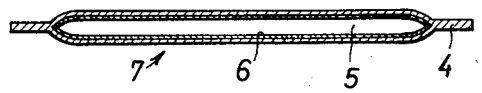
FIG. 4
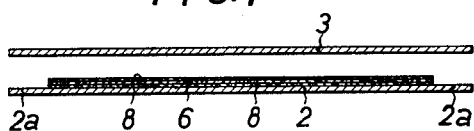
*INVENTOR.*
*BY*

METHOD FOR PRODUCING TUBE IN SHEETS

The present invention relates to a method for producing tube in sheets, more particularly to a method for producing tube in aluminum sheets having a corrosion resisting layer in the passage.

The term "aluminum" as used in this specification and the appended claims include pure aluminum, commercial aluminum containing a small amount of impurities and all aluminum alloys other than aluminum-zinc alloy.

It is already known to weld two or more aluminum sheets together with a pattern of stop weld material disposed between the sheets and introduce a fluid of high pressure between the portions which have not been bonded together due to the presence of the stop weld so as to distend the non-bonded portions into a tubular form. The sheet with a tubular passage obtained by this process is called "tube in sheet" and aluminum sheets of this type are particularly useful. The principle to produce the tube in sheet is disclosed in the U.S. Pat. No. 2,690,002. Generally employed as the stop weld material is a mixture of graphite and a dispersing agent like water glass with or without further addition of a separation material such as zinc oxide, diatomaceous earth, talc, powdered quartz or clay.

Tube in sheets of aluminum are extensively used in heat exchangers. In the case where gas is passed through the passages of such sheets as in a refrigerator evaporator, the interior of the passageways is free from corrosion, but where water with a content of heavy metal such as iron or copper is passed through the passages as in a water heater utilizing solar heat, boiler for a bath or water boiler, contact corrosion takes place due to the formation of a local cell, since the electrode potential of aluminum is lower than that of the heavy metal; hence pitting corrosion is unavoidable.

For the prevention of corrosion, it is also known to provide the inner surface of the passage with oxidized coating, but this method can not completely preclude occurrence of pitting corrosion. Further there is a proposal in which a core sheet of pure aluminum and an aluminum-zinc alloy sheet serving as a covering member are joined together to produce a material for a tube in sheet. In this case, the internal surface of the passage which is coated with the covering material protects the core sheet at the sacrifice of the covering layer where corrosion is initiated. This method, though very effective against contact corrosion, has a disadvantage that it is complex and costly because two types of sheets must be joined together before roll bonding. In addition, this method has a still more serious difficulty in that since the covering layer on the internal face of the passage extends on the inner faces of the two sheets which are bonded together, the corrosion initiated in the inner face of the passage also develops at the bonded portions to result in local peeling of the sheet and leakage of the fluid.

The problems noted above have been eliminated by the application of a pasty stop weld prepared by adding a solvent to a zinc powder or powdered zinc alloy having a purity of at least about 90 percent and kneading the resultant mixture. This stop weld material is applied, in desired pattern, between at least two aluminum sheets, which are then roll-bonded with part left nonbonded where the stop weld is applied. The coalesced sheets are thereafter annealed, whereby the sheets are softened to the extent suitable for the subsequent treatment while the zinc or zinc alloy serving as the stop weld is diffused into the inner faces of the aluminum sheets to form aluminum-zinc layers. In the last step, a highly pressurized fluid is forced into the nonbonded portion, which is therefore distended into a tubular form to provide a passage. The inner face of the passage is now coated with the aluminum-zinc alloy layer.

Preferably, the particle size of the zinc or zinc alloy powder is about 0.1 to $50\mu$, more preferably about 1 to $20\mu$. It is desirable to use a powder of low oxidation degree.

The zinc or zinc alloy powder may be applied together with aforementioned known stop weld materials which are already known in the art. In the case of a pasty stop weld composition prepared by kneading only zinc or zinc alloy powder with a solvent, hot rolling is more preferable than cold rolling. A desirable reduction of cold is at least about 70 to 90 percent, the most desirable being about 75 percent. A suitable annealing temperature is in the range of about 300° to 600° C. Good results will be achieved by carrying out annealing operation for 2 hours at about 550° C, although the period varies depending upon the annealing temperature.

Where zinc or zinc alloy powder is used in combination with a known stop weld material, both are mixed together and to the resultant mixture is added water or an organic solvent such as alcohol to prepare a pasty composition. But water glass is not always necessary. The former may be used in an amount of about 10 to 90 percent by weight and the latter, about 10 to 90 percent be weight. Most preferably, however, the ratio of zinc or zinc alloy to graphite is about 3 to about 1 because a great difference in the ratio results in only a thin layer diffused with zinc having low resistance to corrosion. Furthermore, after a desired pattern of a known stop weld prepared in pasty form is printed on one of the aluminum sheets to be bonded, a pasty stop weld made of zinc or zinc alloy powder and solvent is applied over the printed paste and a known stop weld may thereafter be printed on the second paste. When the present paste is applied together with a known stop weld, pressure unification and diffusion of zinc can be effected at the same time. The conditions for hot rolling at this time are not particularly different from those for conventional roll bonding operation for aluminum sheets. That is, the reduction may be about more than 60 percent, preferably about 63 percent, in which case perfect bonding is ensured with nonbonded portion provided in orderly form, Hot rolling temperature ranges from about 370° to 560° C. Although satisfactory results are obtained by one step of hot rolling operation, cold rolling step may be additionally performed as desired.

It is desired for better diffusion of zinc to subject the sheets to annealing after roll bonding. The annealing temperature at this time may suitably be about 200° to 600° C, and the annealing time varies depending upon the temperature.

In order to effect diffusion of the zinc or zinc alloy into the interior of the aluminum sheets to form aluminum-zinc alloy layer, there is a need to heat the sheets at least once during or after roll bonding operation. For practical purposes, the thickness of the aluminum-zinc alloy layer is about 5 to 20 percent, preferably about 10 percent of the thickness of one of the sheets bonded together. The thickness of the layer can be adjusted by annealing temperature and time.

The present invention will become more apparent from the following description with reference to the accompanying drawings, in which:

FIG. 1 is a perspective view showing two aluminum sheets as they are separated before bonding, a stop weld material being printed on one of the aluminum sheets;

FIG. 2 is an enlarged view in transverse section showing the two aluminum sheets in FIG. 1, one sheet being laid on the other with the stop weld material disposed therebetween;

FIG. 3 is an enlarged view in transverse section showing a tube in sheet provided with a passage formed by distension subsequent to roll bonding, an aluminum-zinc alloy layer being deposited on the internal face of the passage;

FIG. 4 is a enlarged view in transverse section showing a modified embodiment in which two kinds of stop weld materials are used, the Figure illustrating two separated aluminum sheets before roll bonding operation with the stop weld materials printed on one of the aluminum sheets; and FIG. 5 is a fragmentary perspective view of a radiator, with part shown in section, which employs tube in sheets obtained in accordance with the present invention.

Referring to FIGS. 1 to 3, there is shown a strip of a 1,100 aluminum sheet 2, 3.75 mm. in thickness, with a stop weld material 1 printed thereon by a silk screen except on the opposite margines 2a. The number designation herein used refers to the Aluminum Association Standard Number for wrought aluminum alloy.

The stop weld material 1 is a pasty composition comprising zinc alloy powder of a purity of about 97 percent and having a viscosity adjusted to the degree suitable for screen printing. The particle size of the zinc powder is about 3 to 5$\mu$. Another 1100 aluminum sheet 3 of the same thickness as the sheet 2 is laid on the face of the aluminum plate 2 on which the stop weld is printed and the sheets are subjected to cold rolling at a reduction of about 75 percent. As a result, the two sheets 2 and 3 are pressure unified at opposite margins 2a except at the portion where the stop weld 1 is present. The roll bonded sheet 4 thus obtained is then subjected to annealing for about 2 hours at a temperature of about 500° C. Water is then forced into the nonbonded portion of the roll bonded sheet 4, whereby a flat tubular passage 5 is formed by distension as shown in FIG. 3. By selecting a die, the passage 5 can of course be formed in desired shape in section. It is ascertained by photomicrograph that the diffusion of the zinc in the stop weld 1 into the aluminum sheets during annealing has produced an aluminum-zinc alloy layer 6, about 90$\mu$ in thickness, in the interior surface of the passage 5. In this manner, a tube in sheet 7 provided with an anticorrosive layer is obtained. Since the aluminum-zinc alloy layer 6 has a lower electrode potential than the tube in sheet 7, namely than the starting material of 1,100 aluminum sheets 2 and 3, corrosion takes place first in the aluminum-zinc alloy layer 6 before it takes place in the aluminum sheet when cold or hot water containing heavy metal is passed through the passage 5. In other words, the aluminum-zinc alloy layer 6 serves as a self-sacrificing protective coating for the tube in sheet 7 so as to protect the wall of the passage 5.

By using Zn-5 percent Al alloy powder having the particle size of about 10 to 30$\mu$ for stop weld material 1, a tube in sheet 7 provided with a protective aluminum-zinc alloy layer 6 is obtained under the same treating conditions.

The present stop weld, when used in combination with a known stop weld material, is employed under different treating conditions. To describe this treatment in detail, a stop weld material is prepared by mixing 50 percent of zinc alloy powder having particle sizes of about 3 to 5$\mu$ and a purity of about 97 percent, 23 percent of graphite and water glass in the amount corresponding to the balance. Water is added to the resultant mixture to obtain a pasty composition having a viscosity suitable for screen printing. The stop weld thus prepared is then applied between aluminum sheets 2 and 3 as in the foregoing embodiment. The two sheets 2 and 3 are thereafter subjected to hot rolling at a reduction of about 63 percent and to a subsequent cold rolling operation at a reduction of about 43 percent, after the roll bonded sheet 4 is annealed for about 2 hours at about 550° C, water is forced into the nonbonded portion to form a passage 5. During hot rolling and annealing, the zinc in the stop weld is diffused into the aluminum sheets, with the result that an aluminum-zinc alloy layer 6, having a thickness of about 80$\mu$ and serving as a protective coating, is formed in the interior wall of the passage 5, this being ascertained by a photomicrograph.

FIG. 4 illustrates a modified mode to apply the stop weld material. A stop weld material 8 prepared by mixing about 30 percent of graphite with the balance of water glass and kneading the resultant mixture with water is printed on a sheet 2, one of aluminum sheets 2 and 3, except at opposite margins 2a. Printed on this coating is a pasty stop weld 6 prepared from a solvent and the same zinc powder as the foregoing example, this composition being further covered with the same stop weld 8 as the lowermost layer. The step of laying the other aluminum sheet 3 and subsequent steps are all carried out substantially in the same manner as in the aforementioned embodiment which employs the pasty stop weld comprising zinc powder, graphite, water glass and water.

FIG. 5 shows a radiator 9 made of the tube in sheets 7 obtained by the methods described above. The radiator 9 is built of tube in sheets 7 which are connected by brazing to one another by means of corrugated fins 10.

Each of the tube in sheets produced by the methods described was immersed for 100 days in a corrosion liquid at 60° C. prepared by adding Cu ions to altoona water. However, no pitting corrosion was observed, except that corrosion was found only in the Al – Zn alloy layer on the inner wall of the passage by inspection of a photomicrograph.

For comparison purposes, a tube in sheet obtained by using a conventional stop weld material without treating the interior surface of the passage and another sheet obtained by subjecting the interior surface of the passage to M B V treatment were used. These controls were immersed in the same corrosion liquid for corrosion test, with the result that pitting corrosion was observed to take place in 45 days in the case of the former and in 50 days, in the latter.

The present invention is capable of forming a self-sacrificing, highly corrosion-resisting layer only in the wall surface in the interior passage of the tube in aluminum sheet which has conventionally been difficult to treat for imparting corrosion resistance, the anticorrosive treatment being readily effected by utilizing the step of printing stop weld which is required for the production of the sheet.

What is claimed is:

1. A method for producing a tube in sheet comprising steps of disposing in a predetermined pattern a pasty stop weld material between at least two aluminum sheets, said stop weld material being prepared by kneading zinc powder or zinc alloy powder, graphite, water glass and a solvent into a pasty composition, bonding said aluminum sheets into a bonded sheet by hot rolling with said stop weld disposed therebetween and distending the nonbonded portion of said bonded sheet into a tubular form by introducing a fluid of high pressure into the nonbonded portion.

2. The method for producing a tube in sheet as claimed in Claim 1 wherein said zinc powder or said zinc alloy powder is mixed with said graphite and said water glass at a ratio of about 10 – 90 percent by weight to about 10 – 90 percent by weight.

3. A method for producing a tube in sheet comprising steps of disposing in a predetermined pattern a first pasty stop weld material between at least two aluminum sheets in facing relationship, said stop weld material being prepared by kneading graphite, water glass and a solvent into a pasty composition, disposing a second pasty stop weld material on said first stop weld material, said second stop weld material being prepared by kneading zinc powder or zinc alloy powder and a solvent into a pasty composition, disposing a third pasty stop weld material on said second stop weld material, said third stop weld material being identical with said first stop weld in composition, bonding said aluminum sheets into a bonded sheet by hot rolling with said stop weld disposed therebetween and distending the nonbonded portion of said bonded sheet into a tubular form by introducing a fluid of high pressure into the nonbonded portion.

4. A method for producing a tube in sheet comprising steps of disposing in a predetermined pattern a pasty stop weld material between at least two aluminum sheets, said stop weld material being prepared by kneading zinc powder or zinc alloy powder and a solvent into a pasty composition, bonding aluminum sheets into a bonded sheet by cold rolling with said stop weld disposed therebetween, annealing said bonded sheet to diffuse the zinc into the aluminum sheets to form corrosion-resistant layers, and distending the nonbonded portion of said bonded sheet into a tubular form by introducing a fluid of high pressure into the nonbonded portion.

5. The method of claim 4 wherein said zinc alloy powder has a purity of at least about 90 percent.

* * * * *